United States Patent
Yamane

(10) Patent No.: US 11,987,105 B2
(45) Date of Patent: May 21, 2024

(54) VEHICULAR INTERIOR COMPONENT

(71) Applicant: TOYOTA BOSHOKU KABUSHIKI KAISHA, Aichi-ken (JP)

(72) Inventor: Ryo Yamane, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 429 days.

(21) Appl. No.: 17/404,742

(22) Filed: Aug. 17, 2021

(65) Prior Publication Data
US 2022/0055461 A1  Feb. 24, 2022

(30) Foreign Application Priority Data

Aug. 20, 2020 (JP) ................. 2020-139372

(51) Int. Cl.
*B60J 5/04* (2006.01)
*B32B 5/18* (2006.01)
(Continued)

(52) U.S. Cl.
CPC .............. *B60J 5/0469* (2013.01); *B32B 5/18* (2013.01); *B32B 5/245* (2013.01); *B60J 5/0481* (2013.01);
(Continued)

(58) Field of Classification Search
CPC ...... B60J 5/0469; B60J 5/0481; B60J 5/0484; B60R 13/0243; B60R 13/0206;
(Continued)

(56) References Cited

U.S. PATENT DOCUMENTS 5,009,946 A * 4/1991 Hatomoto ............... B32B 27/36
442/301
5,825,605 A * 10/1998 Sutherland .............. B60R 16/06
361/216

(Continued)

FOREIGN PATENT DOCUMENTS

JP H07-76216 A 3/1995
JP H0776216 A * 3/1995
(Continued)

OTHER PUBLICATIONS

Sera Kenichiro, JP H0776216 A, machine translation, Mar. 20, 1995 (Year: 1995).*

(Continued)

*Primary Examiner* — Amy R Weisberg
*Assistant Examiner* — Wenwei Zhuo
(74) *Attorney, Agent, or Firm* — Greenblum & Bernstein, P.L.C.

(57) ABSTRACT

A vehicular interior component includes a body member being in form of a plate shape having a plate surface, a skin disposed on the plate surface of the body member, the skin including an elastic layer that is on the plate surface of the body member and is not electrically conductive and has elasticity and an electricity removal surface layer that is disposed on the elastic layer and configured as a surface of the skin and has static dissipative properties, and an electrically conductive member being electrically conductive and disposed on the body member, the electrically conductive member including a retainer that retains an edge portion of the skin. The elastic layer included in the edge portion of the skin is compressed by the retainer from an electricity removal surface layer side and the electrically conductive member is to be electrically connected to a metal panel.

20 Claims, 9 Drawing Sheets

(51) Int. Cl.
*B32B 5/24* (2006.01)
*B60R 13/02* (2006.01)

(52) U.S. Cl.
CPC .... *B60R 13/0243* (2013.01); *B32B 2307/202* (2013.01); *B32B 2307/51* (2013.01); *B32B 2605/003* (2013.01)

(58) Field of Classification Search
CPC ............... B60R 13/0237; B60R 13/02; B60R 2013/0287; B60N 3/02; B60N 2/79; B60N 2/78; B32B 2605/003; B32B 2307/21
USPC ................................... 296/146.7, 39.1, 1.08
See application file for complete search history.

(56) References Cited

U.S. PATENT DOCUMENTS

2001/0035661 A1* 11/2001 Doshi ..................... B60R 13/01
296/39.1
2011/0221230 A1* 9/2011 Kato ................... B60R 13/0243
296/146.7
2019/0191537 A1* 6/2019 Govea ...................... H05F 3/02

FOREIGN PATENT DOCUMENTS

| JP | 2016-005949 A | | 1/2016 | |
|---|---|---|---|---|
| JP | 2016005949 A | * | 1/2016 | ............. B32B 5/245 |
| JP | 2019-084838 A | | 6/2019 | |
| JP | 2019084838 A | * | 6/2019 | |

OTHER PUBLICATIONS

Yamane et al., JP 2019084838 A, machine translation, Jun. 6, 2019 (Year: 2019).*

Kunisada Hideaki, JP 2016005949 A, machine translation, Jan. 14, 2016 (Year: 2016).*

Japanese Office Action in counterpart Japanese Application No. JP2020-139372, dated Sep. 19, 2023 (and English translation thereof).

* cited by examiner

VEHICULAR INTERIOR COMPONENT

CROSS REFERENCE TO RELATED APPLICATION

This application claims priority from Japanese Patent Application No. 2020-139372 filed on Aug. 20, 2020. The entire contents of the priority application are incorporated herein by reference.

TECHNICAL FIELD

The present technology described herein relates to a vehicular interior component.

BACKGROUND

A vehicular interior component having a function of removing static electricity has been known. As an example of such a vehicular interior component, the pocket member of a door panel is known. The pocket member includes an electrically conductive portion having a holding surface that is touched by an occupant's hand and the electrically conductive portion is made of electrically conductive resin. Static electricity charged in the occupant is discharged to the vehicle if the occupant touches the holding surface.

SUMMARY

In such a pocket member, the electrically conductive portion including the holding surface may be a plate member that is made of only electrically conductive resin or may include a base member made of insulating resin and a skin made of electrically conductive elastomer disposed on the surface of the base member. The electrically conductive portion including conductive elastomer as the skin can provide good grip feeling (sense of close contact). However, in such a configuration, when a person touches the electrically conductive portion with his or her hand, he or she cannot feel touch of soft and high quality.

An object of the present technology described herein is to provide a vehicular interior component that achieves a function of removing static electricity and soft touch with high quality.

To solve the above problems, a vehicular interior component according to the technology described herein includes a body member being in form of a plate shape having a plate surface, a skin disposed on the plate surface of the body member and including an elastic layer and an electricity removal surface layer, and an electrically conductive member being electrically conductive and disposed on the body member. The electrically conductive member includes a retainer that retains an edge portion of the skin. The elastic layer of the skin is on the plate surface of the body member and is not electrically conductive and has elasticity. The electricity removal surface layer of the skin is disposed on the elastic layer and configured as a surface of the skin and has static dissipative properties. The elastic layer included in the edge portion of the skin is compressed by the retainer from an electricity removal surface layer side and the electrically conductive member is to be electrically connected to a metal panel.

DETAILED DESCRIPTION

Figure 1:
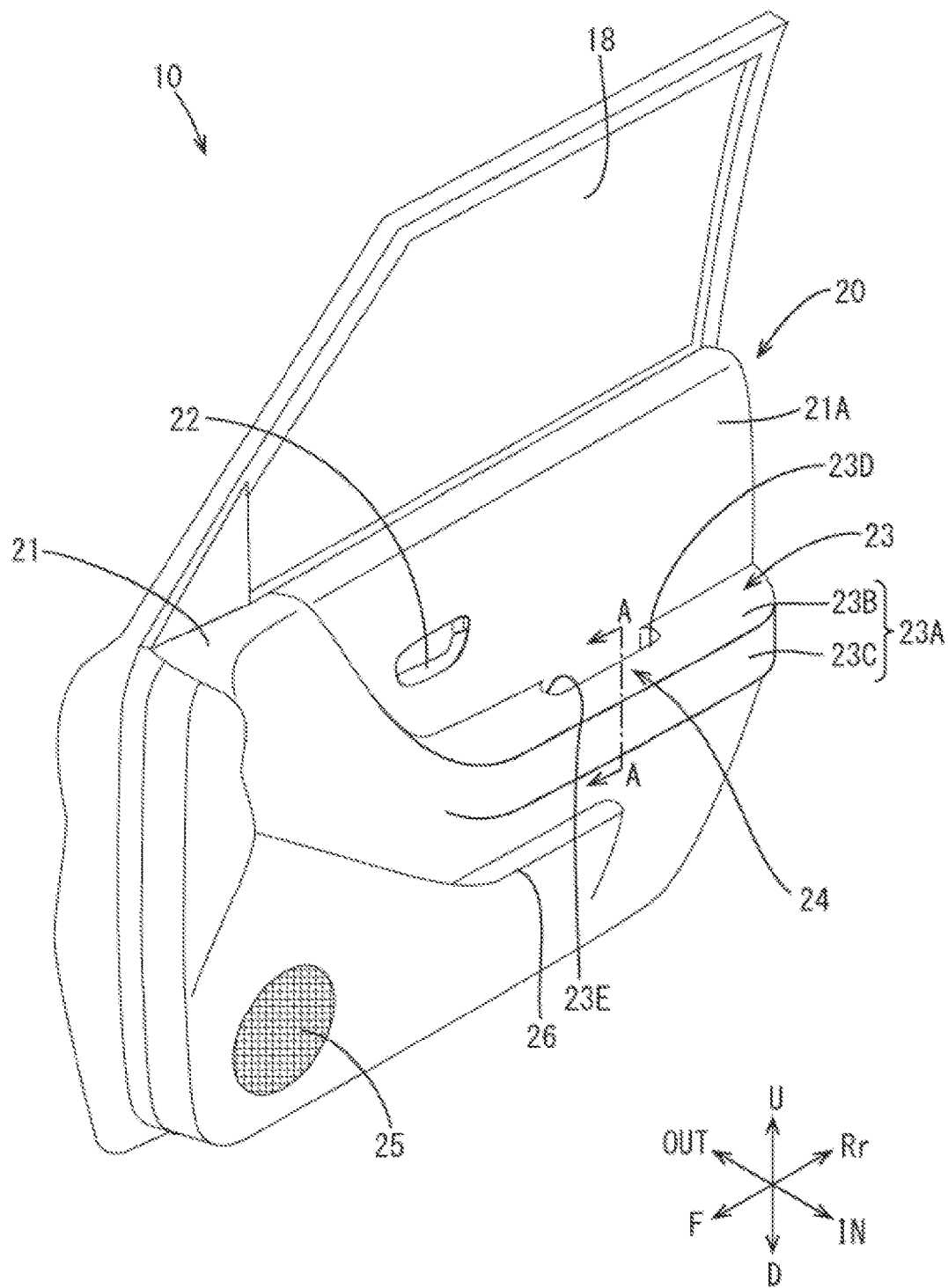
FIG. 1 is a perspective view illustrating a vehicular door including a door trim.

A door trim 20 will be described with reference to FIGS. 1 to 8. The door trim 20 in FIG. 1 is included in a right door 10 of a vehicle and a left door also includes a door trim having the similar configuration. The symbols of F, Rr, U, D, IN, and OUT illustrated in each drawing represent a front side and a rear side with respect to a vehicular forwarding direction, an upper side and a lower side with respect to the vertical direction (an upper-lower direction), a vehicular interior side and a vehicular exterior side, respectively. The directions are defined for certain convenience and are not limited to those described in the drawings.

Figure 2:
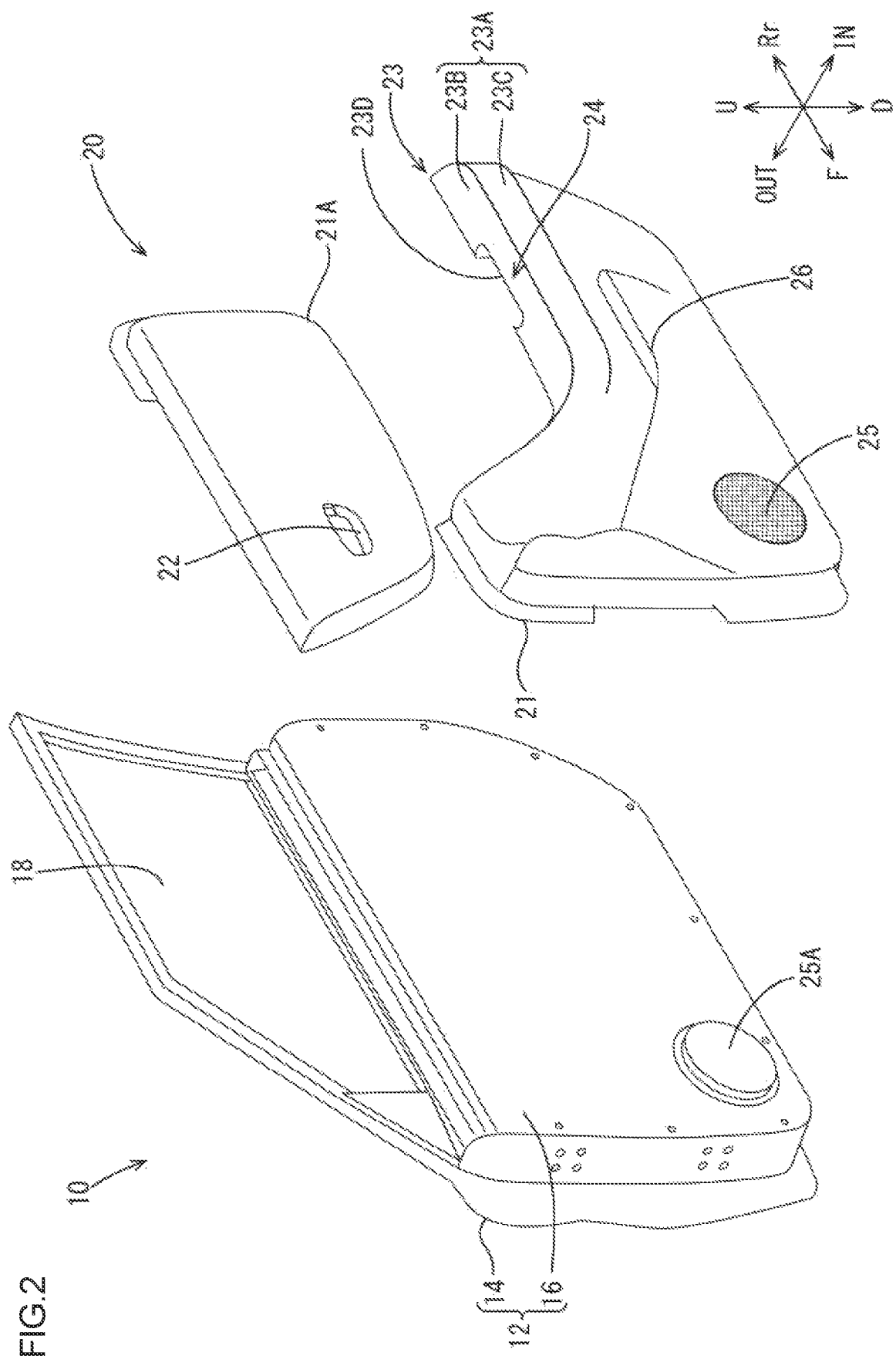
FIG. 2 is an exploded view illustrating the vehicular door.

As illustrated in FIGS. 1 and 2, the door trim 20 described herein is mounted on a vehicular interior side with respect to a door panel 12 of a vehicular door 10. The door trim 20 is configured as a wall surface of a vehicular compartment for improving appearance of the vehicular compartment and increasing comfort in the vehicular compartment. As illustrated in FIG. 2, the door panel 12 includes a door outer panel 14 and a door inner panel 16 that have a plate shape and each of which is formed by pressing a metal panel made of steel or aluminum. Various components such as a speaker 25A and a lifting and lowering mechanism for lifting and lowering a window glass 18 are arranged between the door inner panel 16 and the door outer panel 14.

The door trim 20 includes various vehicular functional interior components such as an inside handle 22, an armrest 23, a door pull handle 24, a speaker grill 25 that covers the speaker 25A, and a door pocket 26. The door trim 20 includes a trim board 21 having a plate shape as an interior component body member and an upper trim 21A. As illustrated in FIG. 2, the trim board 21 includes board members that are fitted to each other. A vehicular functional interior component may be mounted on the board member and some of the board members may be fitted together to be configured as a vehicular functional interior component. The trim board 21 (a board member) is made of synthetic resin material having electrical insulating properties such as polypropylene.

The armrest 23, which is one of the vehicular functional interior components, includes an armrest portion 23A that projects toward the vehicular interior side with respect to the upper trim 21A. An occupant who is seated on a seat puts the occupant's arm on the armrest 23. As illustrated in FIG. 1, the armrest 23 includes the door pull handle 24 in a middle section of the armrest 23 with respect to the front-rear direction. The door pull handle 24 includes a recessed portion 23E. The occupant who is seated on the seat puts the occupant's hand in the recessed portion of the door pull handle 24 to open and close the vehicular door 10.

Figure 3:
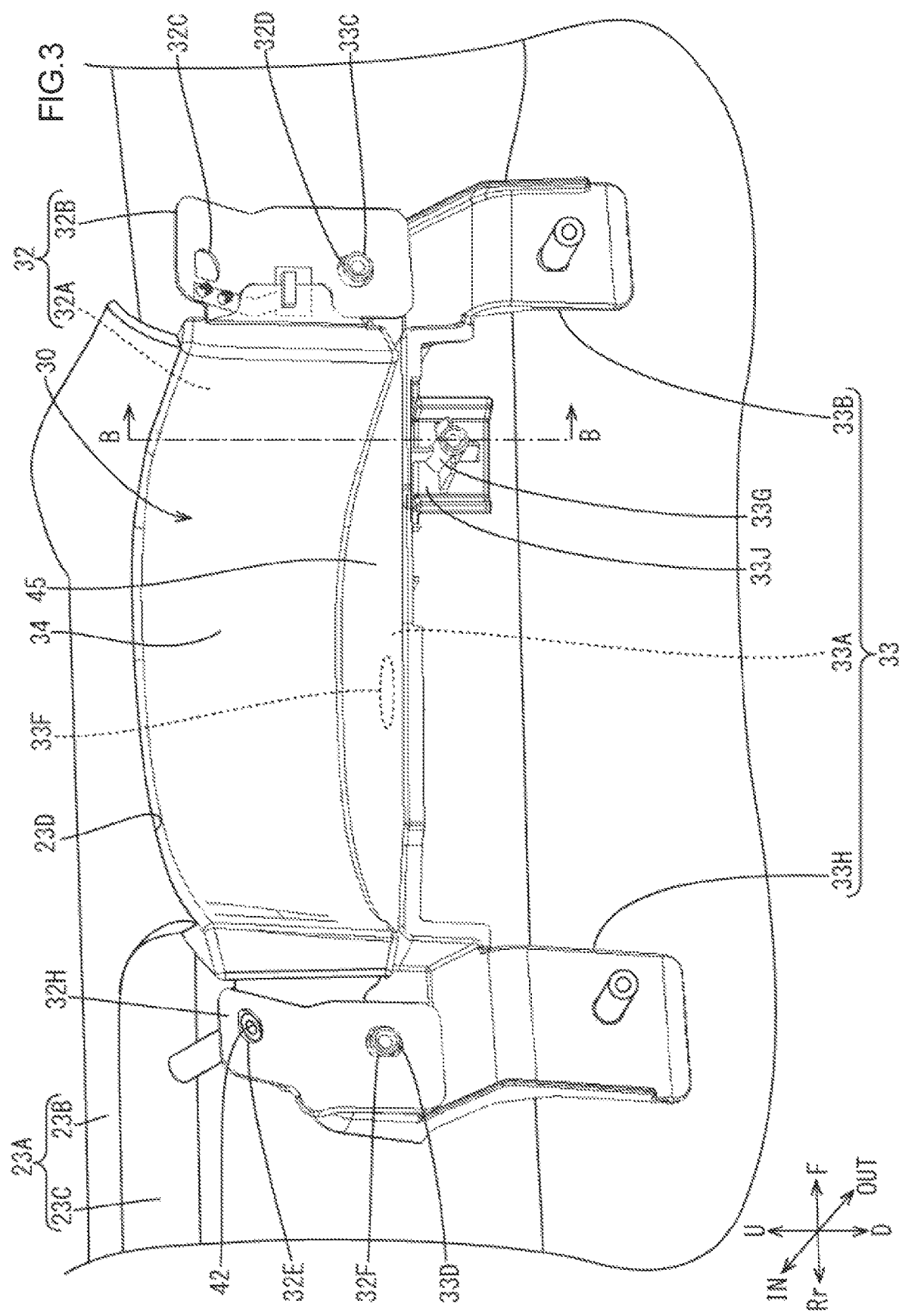
FIG. 3 is a perspective view illustrating a pull handle member of the vehicular door.
Figure 4:
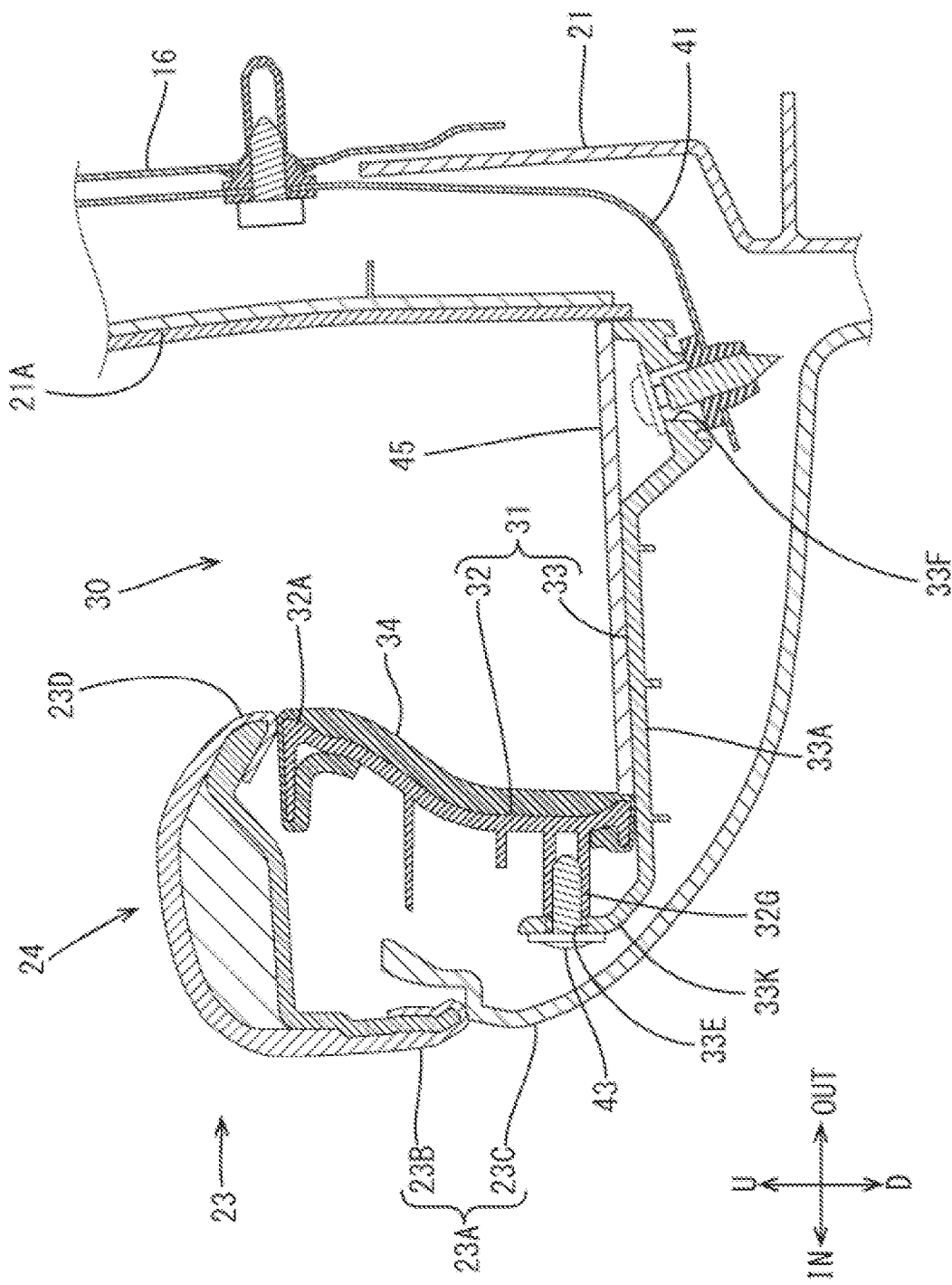
FIG. 4 is a cross-sectional view of a door pull handle taken along A-A line in FIG. 1.

More specifically, the armrest portion 23A includes an arm support surface portion 23B that faces upward and a lower portion 23C that supports the arm support surface portion 23B from a lower side. The armrest 23 includes the recessed portion 23E in a middle section of the arm support surface portion 23B with respect to the front-rear direction. As illustrated in FIG. 4, the recessed portion 23E has an opening 23D between the upper trim 21A and the arm support surface portion 23B. As illustrated in FIGS. 3 and 4, the door pull handle 24 includes a pull handle member 30 in the recessed portion 23E. The pull handle member 30 is disposed between the armrest 23 and the upper trim 21A.

The pull handle member 30 is fixed to the upper trim 21A to form a box shape that opens upward with the opening 23D. As illustrated in FIGS. 3 and 4, the pull handle member 30 includes a body member 31 and skins 34, 45 that are put on an inner surface of the body member 31. The body member 31 includes a side wall member 32 and a bottom member 33. The side wall member 32 has a vehicular exterior side surface that is covered with the skin 34 and the bottom member 33 has an upper surface that is covered with the skin 45. The vehicular exterior side surface of the side wall member 32 that is covered with the skin 34 is configured as an inner wall surface of the pull handle member 30. The upper surface of the bottom member 33 that is covered with the skin 45 is configured as a bottom surface of the pull handle member 30.

As illustrated in FIG. 4, the side wall member 32 includes a side wall body portion 32A, a front side wall mount portion 32B, and a rear side wall mount portion 32H. The side wall body portion 32A has two opposing long edges and two opposing short edges. The bottom member 33 is continuous from a lower long edge of the side wall body portion 32A. The side wall body portion 32A is an arched thin plate. The front side wall mount portion 32B and the rear side wall mount portion 32H extend from a front-side short edge and a rear-side short edge of the side wall body portion 32A in a front-rear direction, respectively. Each of the front side wall mount portion 32B and the rear side wall mount portion 32H is a plate member. The front side wall mount portion 32B includes an upper through hole 32C and a lower through hole 32D and the rear side wall mount portion 32H includes an upper through holes 32E and a lower through hole and 32E As illustrated in FIG. 3, upper portions of the front side wall mount portion 32B and the rear side wall mount portion 32H including the respective upper through holes 32C and 32E are bent toward the vehicular exterior side.

As illustrated in FIG. 3, the bottom member 33 includes a bottom body portion 33A, a front side bottom mount portion 33B, and a rear side bottom mount portion 33H. The bottom body portion 33A is a semicircular plate. The front side bottom mount portion 33B and the rear side bottom mount portion 33H extend from the bottom body portion 33A. The front side bottom mount portion 33B and the rear side bottom mount portion 33H are on the front side and the rear side with respect to the bottom body portion 33A, respectively. The front side bottom mount portion 33B and the rear side bottom mount portion 33H include overlapping portions that overlap the front side wall mount portion 32B and the rear side wall mount portion 32H of the side wall member 32, respectively. The overlapping portions of the front side bottom mount portion 33B and the rear side bottom mount portion 33H include mount bosses 33C, 33D, respectively, and the mount bosses 33C, 33D have a tubular shape and extend toward the vehicular exterior side. The mount bosses 33C, 33D of the bottom member 33 are inserted in the lower through holes 32D, 32F, respectively and are fastened with screws to fix the side wall member 32 and the bottom member 33 each other.

As illustrated in FIG. 4, the bottom member 33 includes a bottom mount portion 33K in a middle section thereof in the front-rear direction and the bottom mount portion 33K extends upward in a vehicular interior edge portion of the bottom body portion 33A. The bottom mount portion 33K includes a through hole 33E. As illustrated in FIG. 4, the side wall member 32 includes a mount boss 32G in a middle section thereof in the front-rear direction. The mount boss 32G has a tubular shape and projects from a back surface (a vehicular interior side surface) of a lower portion of the side wall member 32 toward the vehicular interior side. The mount boss 32G of the side wall member 32 is inserted in the through hole 33E of the bottom member 33 and is tightened with a screw 43. Thus, the side wall member 32 and the bottom member 33 are fixed to each other. Accordingly, the side wall member 32 and the bottom member 33 are integrally connected and configured as the body member 31 of the pull handle member 30. The pull handle member 30 is one example of a contact member.

The bottom member 33 is made of synthetic resin having electrical insulating properties (non-electrically conductive resin) such as polypropylene. The side wall member 32 is made of synthetic resin that is electrically conductive (having static dissipative properties in this embodiment). One example of the synthetic resin that is electrically conductive (has the static dissipative properties in this embodiment) includes synthetic resin that is turned to be electrically conductive (have the static dissipative properties in this embodiment) by mixing electrically conductive fillers of fine particles, fabrics made of metal, or carbon with the synthetic resin generally having electrical insulating properties such as polypropylene. Another example of the synthetic resin that is electrically conductive (has the static dissipative properties in this embodiment) includes electrically conductive polymer exerting the electrically conductive properties by a polymer structure. The side wall member 32 is one example of an electrically conductive member. The front side wall mount portion 32B and the rear side wall mount portion 32H are made of synthetic resin that is electrically conductive (having static dissipative properties in this embodiment) similar to the side wall member 32.

Each of the skins 34, 45 is an interior lining member. The skin 34 is disposed on the side wall member 32 to cover a portion of a surface of the side wall member 32. The skin 45 is disposed on the bottom member 33 to cover a portion of a surface of the bottom member 33. The skin 34 that covers the side wall member 32 is configured as a contact surface that is touched by a vehicle occupant when the occupant closes and opens the door 10. Specifically, the skin 34 covers the side wall body portion 32A of the side wall member 32. The skin 34 improves the outer appearance design of the side wall member 32 and provides the side wall member 32 with the static dissipative properties and touch feeling of high quality.

Figure 7:
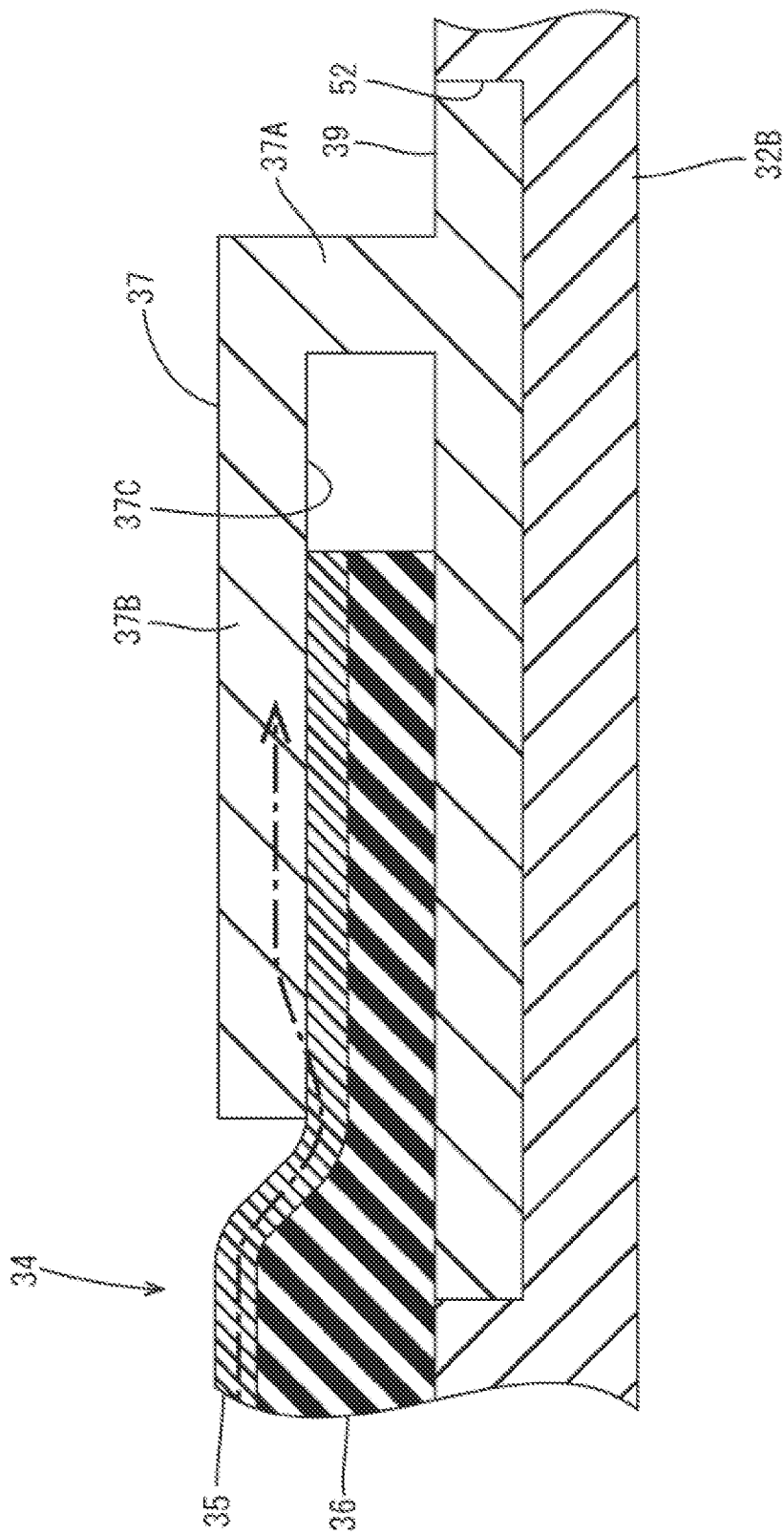
FIG. 7 is a cross-sectional view taken along C-C line in FIG. 6 and illustrating a portion of the pull handle member near a retainer.

As illustrated in FIG. 7, the skin 34 includes an electricity removal surface layer 35 that has the static dissipative properties and an elastic layer 36 that has elasticity and is not electrically conductive. The electricity removal surface layer 35 and the elastic layer 36 are disposed on top of each other and the skin 34 has an integrally layered structure. The skin 34 is disposed on the side wall member 32 such that the elastic layer 36 is opposite the side wall member 32. The skin 34 is disposed on the surface of the side wall body portion 32A such that the electricity removal surface layer 35 faces the space of the recessed portion 23E and the upper trim 21A.

Examples of the electricity removal surface layer 35 include a fabric skin such as woven fabric, non-woven fabric, and knitted fabric each of which is provided with the static dissipative properties by including electrically conductive fibers made of metal or carbon, a synthetic skin sheet that is made of synthetic resin provided with the static dissipative properties by including electrically conductive fibers or electrically conductive fine particles, and a resin sheet that is provided with the static dissipative properties by having an appropriate polymer structure. The electricity removal surface layer 35 of this embodiment is an electrically conductive fabric skin that is made of a knitted fabric obtained by knitting together with the electrically conductive fibers.

The elastic layer 36 may be made of elastic material that can achieve desired flexibility and may be preferably made of foaming resin such as urethane foam. The elastic layer 36 may have the static dissipative properties similar to the electricity removal surface layer 35. However, in a practical view, the foaming resin having good flexibility is less likely to have the static dissipative properties due to a porous structure thereof. The skin 45 that covers the bottom member 33 is provided to improve the outer design appearance of the bottom member 33. A synthetic resin sheet (such as synthetic leather) may be used for the skin 45.

In this embodiment, when a component has the static dissipative properties, the surface resistance (Rs: $\Omega/\square$) of the component satisfies the formula: $1*10^4 \leq Rs < 1*10^{12}$, and more specifically, the formula: $1*10^5 \leq Rs < 1*10^{11}$. The surface resistance Rs is defined based on IEC 61340-2-3: 20001. If the surface resistance of the component is within the above range and a person who is charged with static electricity touches a surface of the component, the static electricity charged in the person can be slowly dissipated to the component without applying any pain or shock to the person and the static electricity is removed from the person's body.

When a component is electrically conductive in the technology described herein, the surface resistance (Rs: $\Omega/\square$) of the component may satisfy the formula: $Rs < 1*10^{12}$, and typically, the formula: $Rs \leq 1*10^{14}$, and specifically, the formula: $Rs \leq 1*10^{-2}$. The volume resistivity defined based on JIS K 7194 is typically equal to or smaller than $10^5$ $\Omega$cm, preferably equal to or smaller than $10^{-3}$ $\Omega$cm, more preferably equal to or smaller than $10^{-1}$ $\Omega$cm, and, for example, equal to or smaller than $10^{-6}$ $\Omega$cm.

When a component has the electrical insulating properties, the surface resistance (Rs: $\Omega/\square$) of the component satisfies the formula: $10^{12} \leq Rs$, and the volume resistivity is equal to or greater than $10^6$ $\Omega$cm, and typically equal to or greater than $10^8$ $\Omega$cm, and for example, equal to or greater than $10^{10}$ $\Omega$cm.

Figure 8:
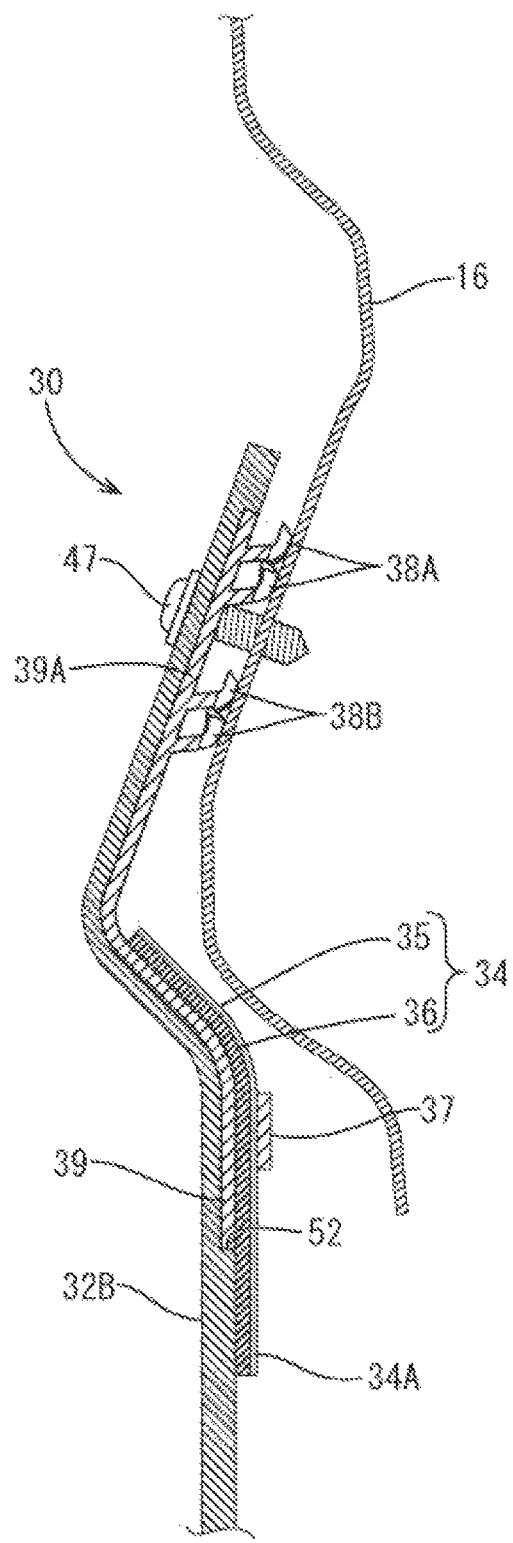
FIG. 8 is a cross-sectional view illustrating contact portions of the connecting member are contacted with a door inner panel.

As illustrated in FIG. 3, a fixing member 42 is inserted in the upper through hole 32E of the rear side wall mount portion 32H and the side wall member 32 is fixed to the arm support surface portion 23B with the fixing member 42. As illustrated in FIG. 8, a fixing member 47 is inserted in the upper through hole 32C of the front side wall mount portion 32B and the side wall member 32 is fixed to the door inner panel 16 with the fixing member 47. As illustrated in FIG. 4, the bottom body portion 33A of the bottom member 33 includes a screw hole 33F and the bottom member 33 is fixed to a bracket 41 having an L-shape with a screw. The bracket 41 is fixed to the door inner panel 16, Thus, the pull handle member 30 is supported by the door inner panel 16 via the bracket 41.

Figure 5:
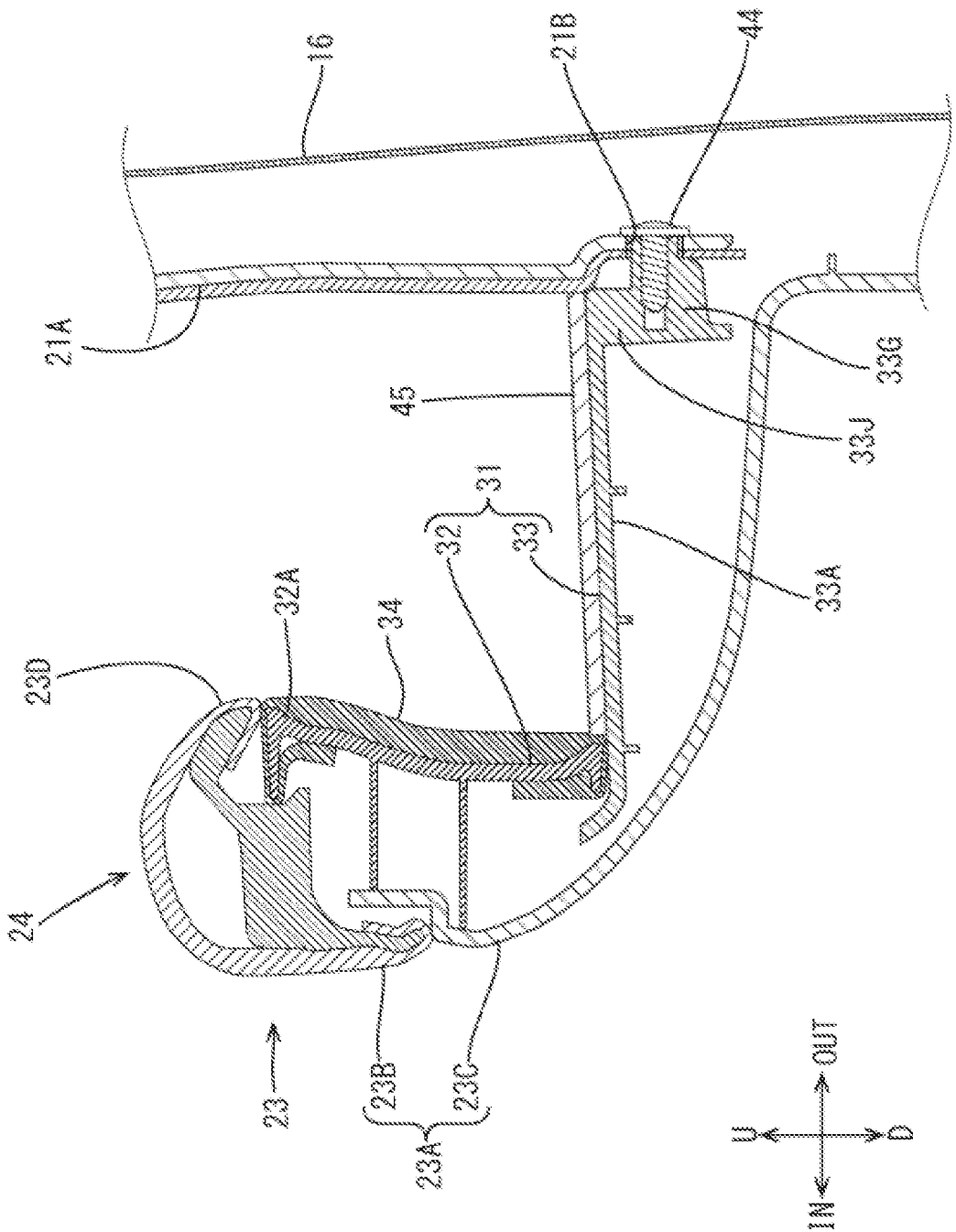
FIG. 5 is a cross-sectional view of the door pull handle member taken along B-B line in FIG. 3.

As illustrated in FIGS. 3 and 5, the bottom body portion 33A includes a mount portion 33J that extends downward along the upper trim 21A from a vehicular exterior side edge of the bottom body portion 33A. The mount portion 33J includes a mounting boss 33G that has a tubular shape and extends from the mount portion 33J toward the vehicular exterior side. The mounting boss 33G is inserted in a through hole 21B of the upper trim 21A and a mounting screw 44 is screwed into the mounting boss 33G to fix the pull handle member 30 to the upper trim 21A.

Figure 6:
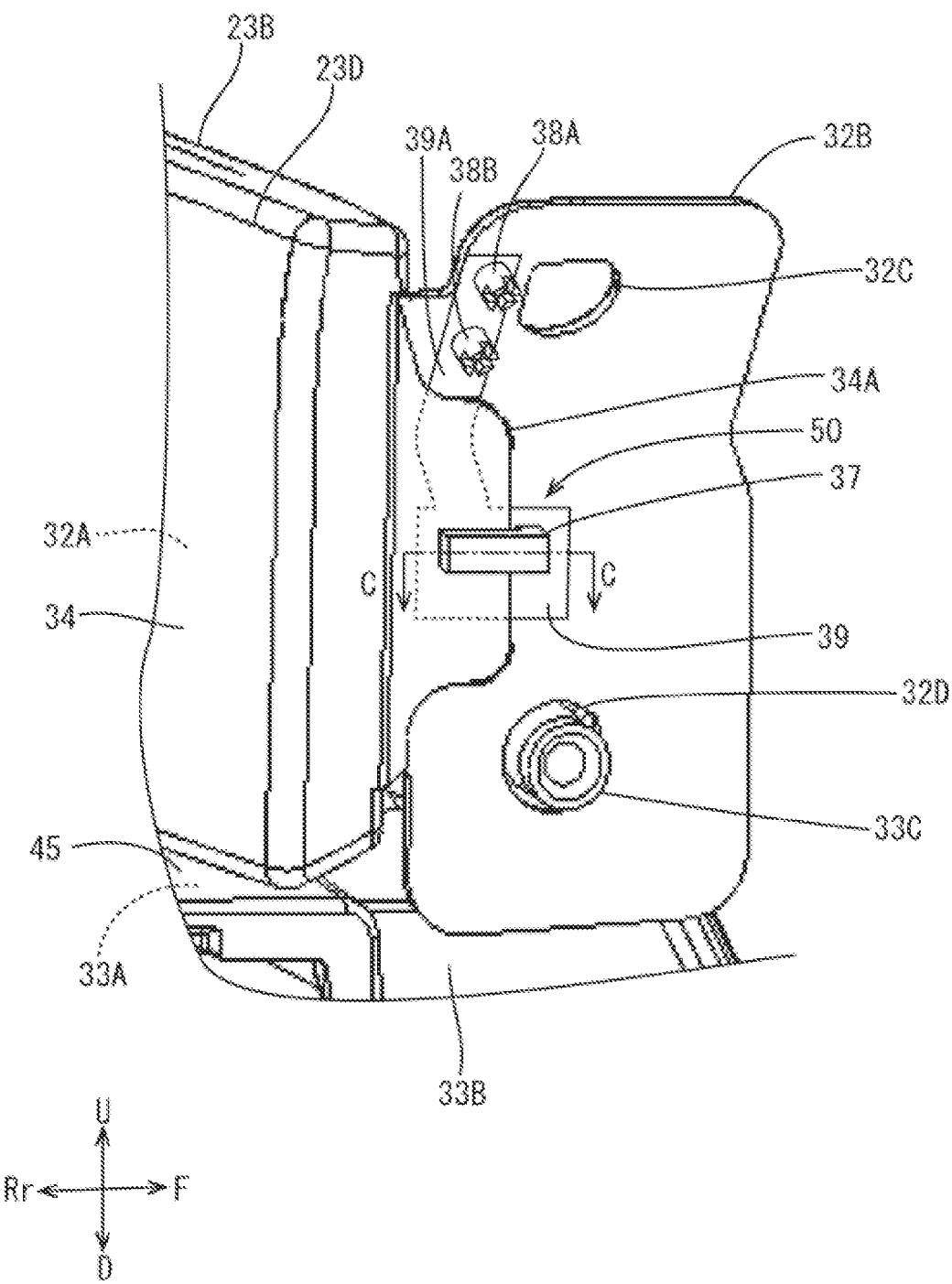
FIG. 6 is an enlarged view illustrating a connecting member of the pull handle member in FIG. 4.

As illustrated in FIG. 4, the skin 34 includes extra portions, which are to be folded, in an upper edge portion and a lower edge portion thereof, respectively, and the skin 34 is greater than the side wall body portion 32A by the extra portions. The upper and lower extra portions of the skin 34 are folded behind the side wall body portion 32A and are bonded to the back surface (the vehicular interior side surface) of the side wall body portion 32A with adhesive. Accordingly, the upper and lower edges (edge surfaces) of the side wall member 32 are covered with the skin 34 and this improves outer appearance. The side wall body portion 32A is covered with the skin 34 and the skin 34 extends from the front side wall mount portion 32B to the rear side wall mount portion 32H such that the side wall member 32 is not seen through a border section between the pull handle member 30 and the upper trim 21A. This improves the outer appearance of the armrest. As illustrated in FIG. 6, the skin 34 includes an extended portion 34A in a front end portion thereof and the extended portion 34A overlaps the front side wall mount portion 32B.

As illustrated in FIGS. 6 and 7, the front side wall mount portion 32B includes a connecting member 50 (one example of the electrically conductive member) in a recessed portion 52 of a vehicular exterior side surface of the front side wall mount portion 32B. The connecting member 50 includes a base portion 39 of a rectangular plate, an extending portion 39A, a retainer 37, and two projections 38A, 38B (a contact portion). The extending portion 39A extends upward from the base portion 39. The retainer 37 projects from a plate surface of the base portion 39 toward the vehicular exterior side. The projections 38A, 38B project from the extended end portion of the extending portion 39A toward the vehicular exterior side. As illustrated in FIG. 7, the retainer 37 is an L-shaped member. The retainer 37 includes a first section 37A that projects from a plate surface of the base portion 39 toward the vehicular exterior side and a second section 37B that extends from a projected end of the first section 37A toward the vehicular rear side. The second section 37B of the retainer 37 extends parallel to the plate surface of the base portion 39. The second section 37B is away from the plate surface of the base portion 39. The retainer 37 and the plate surface of the base portion 39 define a space 37C therein.

As illustrated in FIGS. 6 and 7, the extended portion 34A (the front end portion) of the skin 34 overlaps the front side wall mount portion 32B and is inserted into the space 37C between the plate surface of the base portion 39 and the retainer 37. A distance between an inner surface of the second section 37B and the plate surface of the base portion 39 is smaller than a thickness of the skin 34. With such a configuration, as illustrated in FIG. 7, when the retainer 37 retains the extended portion 34A therein, the electricity removal surface layer 35 is contacted with an inner surface of the second section 37B and the elastic layer 36 of the extended portion 34A (the front end portion) of the skin 34 is compressed and deformed in the thickness direction by the retainer 37.

As illustrated in FIGS. 6 and 8, the extending portion 39A extends from the base portion 39 to the vicinity of the upper through hole 32C and the extending portion 39A includes the projections 38A, 38B (the contact portion) on the rear side with respect to the upper through hole 32C. In this embodiment, the retainer 37, the projections 38A, 38B, the base portion 39, and the extending portion 39A are made of material that is elastic and electrically conductive (has static dissipative properties) such as electrically conductive elastomer. The retainer 37, the projections 38A, 38B, the base portion 39, and the extending portion 39A are integrally formed and configured as the connecting member 50. The connecting member 50 is fitted in the recessed portion 52 of the front side wall mount portion 32B.

More specifically, the connecting member 50 (the electrically conductive member) that includes the retainer 37, the projections 38A, 38B, the base portion 39, and the extending portion 39A is made of electrically conductive elastomer. The electrically conductive elastomer is compatible with the resin of the front side wall mount portion 32B. The connecting member 50 is integrally formed with the front side wall mount portion 32B with double molding.

As illustrated in FIG. 6, each of the projections 38A, 38B includes four separate pieces in the projected end portion. The four separate pieces defined by a cross-shaped recess. According to such a configuration, when the door trim 20 is mounted on the door inner panel 16, as illustrated in FIG. 8, the projections 38A, 38B are contacted with the door inner panel 16 while the separate pieces of the projections 38A, 38B being elastically deformed. Therefore, the projections 38A, 38B are surely contacted with the vehicular interior side surface of the door inner panel 16 with larger areas. The projections 38A, 38B, the retainer 37, the base portion 39, and the extending portion 39A are one example of the electrically conductive member.

In the door trim 20 having the above configuration, the pull handle member 30 includes the side wall member 32, which is a plate member, the skin 34, and the connecting member 50 (the electrically conductive member). The skin 34 covers at least a portion of the side wall member 32 to be configured as a contact surface that is touched by an occupant. The connecting member 50 is mounted on the side wall member 32 and includes the projections 38A, 38B, the base portion 39, the extending portion 39A, and the retainer 37. The connecting member 50 is electrically conductive and can be electrically connected to the door inner panel 16.

The skin 34 includes the electricity removal surface layer 35 that has the static dissipative properties and the elastic layer 36 that has elasticity and is not electrically conductive. The electricity removal surface layer 35 and the elastic layer 36 are disposed on top of each other and the skin 34 has an integrally layered structure. The elastic layer 36 and the electricity removal surface layer 35 are integrally formed with each other. The elastic layer 36 is on the side wall member 32 side and the electricity removal surface layer 35 is layered on the electricity removal surface layer 35. The connecting member 50 includes the retainer 37 that is contacted with the electricity removal surface layer 35 and compresses and deforms the elastic layer 36 in the thickness direction.

According to the above configuration, since the skin 34 includes the elastic layer 36 in addition to the electricity removal surface layer 35, the skin 34 has effective flexibility. Since the elastic layer 36 is not electrically conductive, the electricity removal surface layer 35 and the side wall member 32 are not electrically connected to each other in the thickness direction. In the front end portion of the skin 34, the retainer 37 is contacted with the electricity removal surface layer 35 while compressing and deforming the elastic layer 36 and the retainer 37 is closely contacted with the electricity removal surface layer 35. The electricity removal surface layer 35 is electrically connected to the door inner panel 16 via the retainer 37, the base portion 39, the extending portion 39A, and the projections 38A, 38B. According to such a configuration, the pull handle member 30 has a function of removing or discharging static electricity from a human's body. As a result, a vehicular interior functional component that achieves the function of removing static electricity and soft touch with high quality can be provided.

According to the above configuration, the skin 34 includes the elastic layer 36, which has elasticity and is not electrically conductive, between the electricity removal surface layer 35 and the side wall member 32. The feeling of softness that an occupant has when the occupant touches the skin 34 of the pull handle member 30 can be adjusted by altering properties of the elastic layer 36. For example, the skin 34 of the pull handle member 30 can provide an occupant with more gentle feeling of touch than the conventional one. The electricity removal surface layer 35 and the connecting member 50 (the retainer 37) can be contacted with each other closely by using the characteristics of the elastic layer 36 to establish electrical connection therebetween appropriately. This achieves a vehicular interior component having the function of removing static electricity and soft touch with high quality.

In the above configuration, the skin 34 and the side wall member 32 (one example of a base member) are separate components and at least a portion of the side wall member 32 is covered with the skin 34. The pull handle member 30 includes the side wall member 32 that is wrapped with the skin 34. According to such a configuration, various types of skins 34 may be used in combination for one side wall member 32 to obtain the pull handle member 30 and the pull handle member 30 with various designs can be easily produced. The design of the skin 34 can be freely determined and the outer appearance and the sense of touch with high quality can be achieved compared to a configuration including the skin that is integrally molded with the side wall member 32 with powder slush molding.

In the above configuration, the electricity removal surface layer 35 is an electrically conductive fabric skin that includes at least one of a synthetic resin sheet, woven fabric, non-woven fabric, or knitted fabric each of which includes electrically conductive fibers. Thus, the electricity removal surface layer 35 has various designs and various types of sense of touch, and the door trim 20 including the pull handle member 30 having various designs and various types of sense of touch on a surface can be provided.

Furthermore, in the above configuration, the elastic layer 36 that includes foaming resin can be deformed more gently and flexibly due to the porous structure thereof compared to a configuration including the layer made of resin having a solid structure. The skin 34 includes such an elastic layer 36 and therefore, when an occupant touches the contact surface of the pull handle member 30 that includes the elastic layer 36, the occupant feels gentle and soft touch of sense with high quality. Thus, the pull handle member 30 including the contact surface that can provide sense of touch with higher quality is achieved.

Furthermore, in the above configuration, the connecting member 50 (the electrically conductive member) includes the projections 38A, 38B (the contact portion), which are contacted with the door inner panel 16, the retainer 37, and the extending portion 39A that connects the retainer 37 and the projections 38A, 38B. Since at least the projections 38A, 38B are made of electrically conductive elastomer, the projections 38A, 38B have soft and high elastic properties. Therefore, the projections 38A, 38B are able to be contacted with the vehicular interior surface of the door inner panel 16 while being elastically deformed. In the mounting process, dimension errors may be caused. According to the above configuration, the dimension errors can be absorbed by the deformation of the projections 38A, 38B made of elastomer when the projections 38A, 38B are contacted with the door inner panel 16.

The pull handle member 30 is a holding member that is held by an occupant when the door 10 is opened and closed. For example, when the door is opened and closed, a great force acts on the door inner panel 16 in a direction pushing and pulling the door inner panel 16, respectively. When the door is opened and closed, the great force locally acts on the pull handle member 30 and this may cause deformation or twisting of the pull handle member 30 with respect to the door inner panel 16. Furthermore, when an occupant leaves the vehicular seat, the occupant is likely to be charged with static electricity with peeling charging. In this embodiment, since the projections 38A, 38B are made of electrically conductive elastomer, the deformation or the twisting can be absorbed by the elastic deformation of the projections 38A, 38B and the static electricity charged in the occupant can be dissipated to the door inner panel 16 via the electrical connection between the projections 38A, 38B and the door inner panel 16. The pull handle member 30 that can exert the function of discharging static electricity more surely with a simple configuration can be achieved.

In the above configuration, the side wall member 32 (the base member), the retainer 37, the projections 38A, 38B, the base portion 39, and the extending portion 39A (the electrically conductive member) include resin, respectively, and are configured as one integrally molded component that is the connecting member 50. The side wall member 32 is integrally molded with the connecting member 50. Accordingly, the side wall member 32 (the base member), the retainer 37, the projections 38A, 38B, the base portion 39, and the extending portion 39A, each of which is the electrically conductive member, are configured as one component and this reduces the number of components included in the door trim 20.

Each of the side wall member 32 (the base member), the retainer 37, the projections 38A, 38B, the base portion 39, and the extending portion 39A (the electrically conductive member) is made of electrically conductive elastomer. Therefore, the connecting member 50 may not have effective physical properties such as strength or durability to keep the shape of the connecting member 50 or each of the components included in the connecting member 50 due to the elasticity of the electrically conductive elastomer. In this respect, in this embodiment, the connecting member 50 is disposed in the recessed portion 52 of the front side wall mount portion 32B such that the connecting member 50 and the front side wall mount portion 32B are configured as one integrally molded component. Therefore, the front side wall mount portion 32B is configured as a support member that supports the connecting member 50 and the connecting member 50 can obtain effective physical properties as a whole. Thus, the pull handle member 30 including the connecting member 50 with increased durability can be achieved.

As illustrated in FIG. 6, the two projections 38A, 38B are arranged adjacent to each other in the vertical direction and the upper through hole 32C is between the two projections 38A, 38B. When an occupant holds and pushes or pulls the pull handle member 30 to open or close the door 10, the pull handle member 30 may be deformed with twisting around the fixing member 47 that is through the upper through hole 32C to fix the pull handle member 30 to the door inner panel 16. Even in such a case, one of the upper projection 38A and the lower projection 38B is pushed toward the door inner panel 16. Therefore, both of the two projections 38A, 38B are less likely to be spaced away from the door inner panel at the same time. The door panel having improved static electricity discharging properties can be achieved.

OTHER EMBODIMENTS

The technology described herein is not limited to the embodiments described above with reference to the drawings. The following embodiments may be included in the technical scope. The technology described herein may be modified within the technical scope.

(1) The side wall member 32 (the side wall body portion 32A, the front side wall mount portion 32B, and the rear side wall mount portion 32H) may not be made of electrically conductive material or material having static dissipative properties in this embodiment but may be made of material having electrical insulating properties. Each of the retainer 37, the projections 38A, 38B, the base portion 39, and the extending portion 39A may not be made of material having the static dissipative properties but may be made of electrically conductive material that is more electrically conductive than material having the static dissipative properties.

(2) In the above embodiment, the connecting member 50 is electrically connected to the door inner panel 16 such that the two projections 38A, 38B are contacted with the door inner panel 16. However, the number of the projections may be one, three or more. The shape of the distal ends of the projections 38A, 38B is not limited to the shape described in the above embodiment but may be any shape as long as the projection 38A, 38B can be contacted with the door inner panel 16 while being elastically deformed. Namely, the shape of the distal ends of the projections 38A, 38B may be any shape as long as at least one of the projections 38A, 38B can be electrically connected to the door inner panel 16 even if the projection 38A, 38B is moved or deformed with respect to the door inner panel 16.

Figure 9:
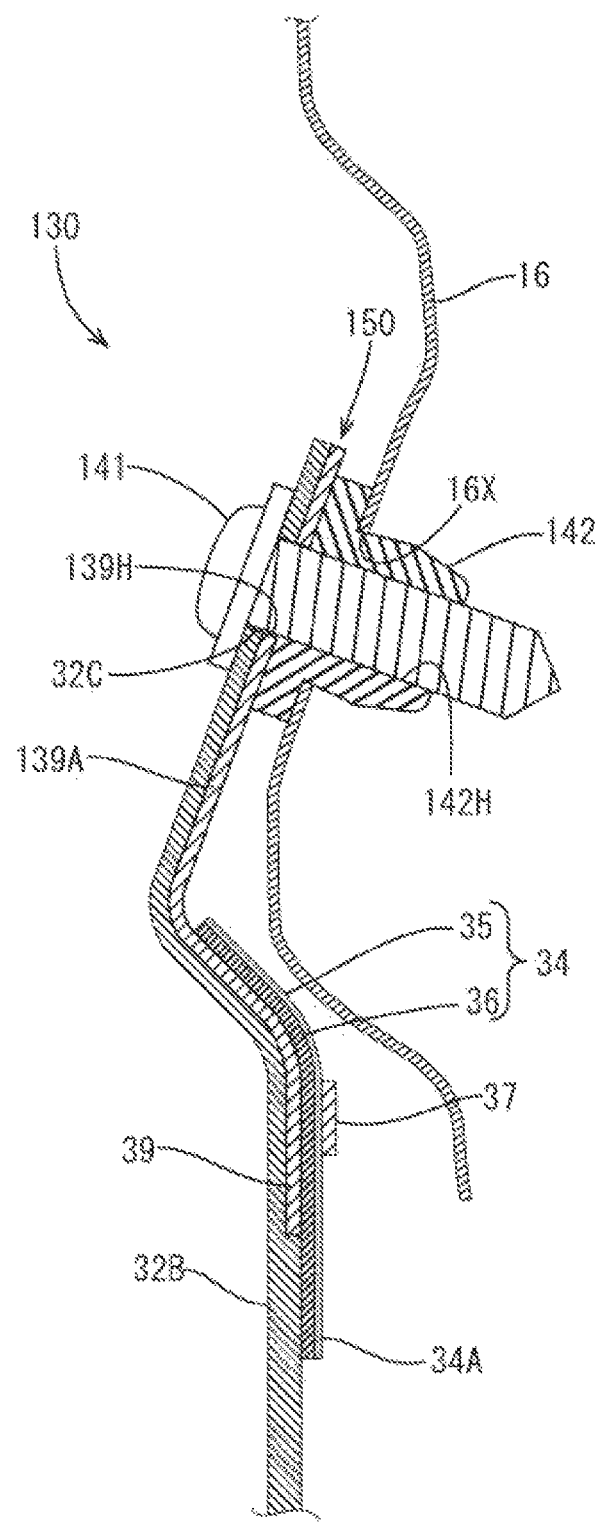
FIG. 9 is a cross-sectional view illustrating a connecting member according to another embodiment.

(3) In the above embodiment, the connecting member 50 (the electrically conductive member) includes the retainer 37, the projections 38A, 38B, the base portion 39, and the extending portion 39A. The connecting member 50 is electrically connected to the door inner panel 16 via the projections 38A, 38B that project from the front side wall mount portion 32B toward the vehicular exterior side and are contacted with the door inner panel 16. However, the electrical connection between the connecting member 50 and the door inner panel 16 is not limited to the above configuration. FIG. 9 illustrates another configuration of the electric connection between a connecting member of a pull handle member 130 and the door inner panel 16. The front side wall mount portion 32B of the pull handle member 130 includes a connecting member 150 as the electrically conductive member. The connecting member 150 includes the retainer 37, the base portion 39, and an extending portion 139A. The extending portion 139A extends from the base portion 39 to an upper edge of the front side wall mount portion 32B and includes an extended end portion near the upper edge. The extended end portion overlaps the upper through hole 32C. The connecting member 150 has an L-shape as a whole. The extending portion 139A includes a through hole 139H in the extended end portion and the through hole 139H and the upper through hole 32C overlap and are continuous to each other.

As illustrated in FIG. 9, the door inner panel 16 includes a through hole 16X and a screw receiving member 142 in the through hole 16X. A screw 141 is inserted into the upper through hole 32C, the through hole 139H, and a through hole 142H of the screw receiving member 142 and fastened to the screw receiving member 142. According to the fastening of the screw 141 to the screw receiving member 142, the through hole 142H of the screw receiving member 142 is enlarged and the connecting member 150 is firmly fixed to the door inner panel 16. The screw receiving member 142 is electrically conductive and is an electrically conductive fastening member. Thus, the connecting member 150 may be electrically connected to the door inner panel 16 with the electrically conductive fastening member that is a separate component from the connecting member 150. Other than the screw 141 and the screw receiving member 142, which are included in the electrically conductive fastening member, a rivet or a member to be crimped may be used as the electrically conductive fastening member.

(4) In the above embodiments, the pull handle member 30 is included in the vehicular door trim 20. However, the configuration of the pull handle member, which is an example of a vehicular interior component, may be included in a quarter trim including a holding member with which an occupant keeps his or her posture, a ceiling interior component and a pillar garnish that include an assist grip. Furthermore, the pull handle member 30, which is an example of a vehicular interior component, may be included in a train, an amusement vehicle, an airplane, a helicopter, a ship, or a submarine.

(5) In the above embodiments, the connecting member 50, 150 is integrally formed with the front side wall mount portion 32B with double molding. However, the front side wall mount portion 32B, which is electrically conductive, may include the retainer 37 and the projections 38A, 38B without including the base portion 39 and the extending portion 39A, 139A.

The invention claimed is:

1. A vehicular interior component comprising:
a body member being in form of a plate shape having a plate surface;
a skin disposed on the plate surface of the body member, the skin including
an elastic layer that is on the plate surface of the body member and is not electrically conductive and has elasticity, and
an electricity removal surface layer that is disposed on the elastic layer and configured as a surface of the skin and has static dissipative properties; and
an electrically conductive member being electrically conductive and disposed on the body member, the electrically conductive member including a retainer that retains an edge portion of the skin, wherein the elastic layer included in the edge portion of the skin is compressed by the retainer from an electricity removal surface layer side,
the electrically conductive member is to be electrically connected to a metal panel, and
each of the body member and the electrically conductive member includes resin material and are configured as a molded one unitary component.

2. The vehicular interior component according to claim 1, wherein the skin and the body member are separate components.

3. The vehicular interior component according to claim 1, wherein the electricity removal surface layer includes at least one of a synthetic resin sheet, a woven fabric, a non-woven fabric, or a knitted fabric each of which includes electrically conductive fibers.

4. The vehicular interior component according to claim 1, wherein the elastic layer includes foaming resin.

5. The vehicular interior component according to claim 1, wherein the electrically conductive member includes
the retainer that is electrically conductive,
a contact portion being made of electrically conductive elastomer and to be contacted with the metal panel included in a vehicle while being in an elastically deformed state, the contact portion comprising a projection, and
an extending portion being electrically conductive and extending between and connecting the retainer and the contact portion.

6. The vehicular interior component according to claim 1, wherein the vehicular interior component is a pull handle member of a door pull handle that is included in a door trim.

7. A vehicular interior component comprising:
a body member being in form of a plate shape having a plate surface;
a skin disposed on the plate surface of the body member, the skin including
an elastic layer that is on the plate surface of the body member and is not electrically conductive and has elasticity, and
an electricity removal surface layer that is disposed on the elastic layer and configured as a surface of the skin and has static dissipative properties; and
an electrically conductive member being electrically conductive and disposed on the body member, the electrically conductive member including a retainer that retains an edge portion of the skin, wherein
the elastic layer included in the edge portion of the skin is compressed by the retainer from an electricity removal surface layer side,
the electrically conductive member is to be electrically connected to a metal panel, wherein the electrically conductive member includes
a base portion that includes the retainer thereon,
an extending portion extending from the base portion and including an extended end portion, the extending portion being elastic and electrically elastically conductive, and
a contact portion included in the extended end portion of the extending portion and made of electrically conductive elastomer, the contact portion being to be contacted with the metal panel included in a vehicle while being in an elastically deformed state.

8. The vehicular interior component according to claim 1, wherein the body member includes a side wall member, the side wall member includes a side wall body portion that has long edges and short edges and is covered with the skin and a side wall mount portion that is continuous from one of the short edges and to be fixed to the metal panel included in a vehicle, and the side wall mount portion is electrically conductive and the side wall mount portion includes the retainer that is electrically conductive and a contact portion that is electrically conductive and to be contacted with the metal panel included in a vehicle while the contact portion being in an elastically deformed state.

9. The vehicular interior component according to claim 1, wherein the retainer that retains the edge portion of the skin is contacted with the electricity removal surface layer while compressing the skin.

10. The vehicular interior component according to claim 7, wherein the retainer includes a first section and a second section, the first section projects from the base portion and the second section extends from a projected end of the first section parallel to the plate surface of the base portion, the first section, the second section, and the base portion define a space therein, and the edge portion of the skin is inserted in the space while being compressed.

11. The vehicular interior component according to claim 10, wherein a distance between the second section of the retainer and the plate surface of the base portion is smaller than a thickness of the skin.

12. The vehicular interior component according to claim 7, wherein the contact portion comprises a projection, and wherein the projection includes at least two projections that are arranged vertically.

13. A vehicular interior component comprising:

a body member being in form of a plate shape having a plate surface;

a skin disposed on the plate surface of the body member, the skin including an elastic layer that is on the plate surface of the body member and is not electrically conductive and has elasticity, and an electricity removal surface layer that is disposed on the elastic layer and configured as a surface of the skin and has static dissipative properties; and an electrically conductive member being electrically conductive and disposed on the body member, the electrically conductive member including a retainer that retains an edge portion of the skin, wherein the elastic layer included in the edge portion of the skin is compressed by the retainer from an electricity removal surface layer side, the electrically conductive member is to be electrically connected to a metal panel, wherein the electrically conductive member includes the retainer that is electrically conductive, a contact portion being made of electrically conductive elastomer and to be contacted with the metal panel included in a vehicle while being in an elastically deformed state, the contact portion comprising a projection, and an extending portion being electrically conductive and extending between and connecting the retainer and the contact portion, and the projection includes separate pieces in a projected end portion of the projection.

14. The vehicular interior component according to claim 7, wherein the body member includes a side wall member, the side wall member includes a side wall body portion that has long edges and short edges and is covered with the skin and a side wall mount portion that is continuous from one of the short edges and to be fixed to the metal panel included in a vehicle, and the side wall mount portion includes the retainer that is electrically conductive and the contact portion.

15. The vehicular interior component according to claim 7, wherein the body member includes a side wall member, the side wall member includes a side wall body portion that has long edges and short edges and is covered with the skin and a side wall mount portion that is continuous from one of the short edges and to be fixed to the metal panel included in a vehicle, and the side wall mount portion is electrically conductive and the side wall mount portion includes the retainer that is electrically conductive and the contact portion.

16. The vehicular interior component according to claim 7, wherein the retainer that retains the edge portion of the skin is contacted with the electricity removal surface layer while compressing the skin.

17. The vehicular interior component according to claim 7, wherein the vehicular interior component is a pull handle member of a door pull handle that is included in a door trim.

18. The vehicular interior component according to claim 13, wherein the projection includes at least two projections that are arranged vertically.

19. The vehicular interior component according to claim 13, wherein the body member includes a side wall member, the side wall member includes a side wall body portion that has long edges and short edges and is covered with the skin and a side wall mount portion that is continuous from one of the short edges and to be fixed to the metal panel included in a vehicle, and the side wall mount portion includes the retainer that is electrically conductive and the contact portion.

20. The vehicular interior component according to claim 13, wherein the vehicular interior component is a pull handle member of a door pull handle that is included in a door trim.

* * * * *